United States Patent
Wires et al.

(10) Patent No.: US 11,233,738 B1
(45) Date of Patent: Jan. 25, 2022

(54) DYNAMIC PERFORMANCE CONFIGURATION FOR DATA TRAFFIC WORKFLOWS

(71) Applicant: Amazon Technologies, Inc., Seattle, WA (US)

(72) Inventors: Jacob Wires, Vancouver (CA); Yuri Zarubin, Vancouver (CA); Leon Thrane, Issaquah, WA (US); Zhiyuan Lin, Vancouver (CA); Nikolaos Koutsikos Tsatsalmas, Vancouver (CA); Marcin Marek Wolicki, Vancouver (CA); Valeri Atamaniouk, Seattle, WA (US); Ming Yiu Andy Siu, Vancouver (CA); Sidharth Bajaj, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 16/917,689

(22) Filed: Jun. 30, 2020

(51) Int. Cl.
*H04L 12/803* (2013.01)
*H04L 12/24* (2006.01)
*H04L 12/851* (2013.01)
*H04L 12/26* (2006.01)
*H04L 12/825* (2013.01)

(52) U.S. Cl.
CPC ........ *H04L 47/125* (2013.01); *H04L 41/0816* (2013.01); *H04L 43/16* (2013.01); *H04L 47/245* (2013.01); *H04L 47/2483* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 2007/0043860 A1* | 2/2007 | Pabari | H04L 41/0886 709/224 |
| 2016/0150421 A1* | 5/2016 | Li | H04L 41/0816 370/235 |
| 2017/0310546 A1* | 10/2017 | Nair | H04L 41/0654 |
| 2018/0183732 A1* | 6/2018 | Keppel | H04L 43/10 |
| 2019/0068619 A1* | 2/2019 | Fan | H04L 63/1416 |
| 2019/0349426 A1* | 11/2019 | Smith | H04L 67/104 |
| 2021/0092015 A1* | 3/2021 | Gardner | H04L 41/0853 |

OTHER PUBLICATIONS

U.S. Appl. No. 16/917,679, filed Jun. 30, 2020, Nikolaos Koutsikos Tsatsalmas, et al.

* cited by examiner

*Primary Examiner* — Eunsook Choi
(74) *Attorney, Agent, or Firm* — Robert C. Kowert; Kowert, Hood, Munyon, Rankin & Goetzel, P.C.

(57) ABSTRACT

The performance of asynchronous tasks may be dynamically configured. An evaluation of pending tasks that includes updates for new tasks and completed tasks being removed is performed. A target capacity for the data traffic workflow is determined from the evaluation of pending tasks in order to satisfy a performance requirement for the data traffic workflow. Modifications to a performance configuration for the data traffic workflow are then made based on a comparison with the target capacity.

20 Claims, 8 Drawing Sheets

DYNAMIC PERFORMANCE CONFIGURATION FOR DATA TRAFFIC WORKFLOWS

BACKGROUND

A cloud provider, or other provider network, may implement multiple network-based services. These services may provide different functionality, such as computational resources, storage resources, data transmission, among various others. To implement various features, techniques for coordinating the performance of operations that implement the features among the services may be utilized.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational performance requirements only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic performance configuration for data traffic workflows are described herein. Some features of different systems or services may include performing operations on a remote system or service in order to implement the feature, in some embodiments. These operations may have dependencies or other relationships between the performance of one operation and another operation, creating a data traffic workflow. Replication, for instance, may include multiple different operations to replicate a set of changes made to a source data object, creating a data traffic workflow. Performance of replication as a data traffic workflow may involve dependencies between the different operations, such as operations to create a new container or location, perform a copy of a new item into the container or location, validate correctness of the new item in the container, and so on, which may involve one, or multiple, systems or services.

Instead of placing the burden of directing the performance of remote of data workflows directly upon the systems that trigger them, a workflow management system may coordinate the traffic to remotely perform the data traffic workflow. The triggering system or service may then treat performance of the data traffic workflow as an asynchronous task that will be handled by other systems so that operation of the triggering system or service is not impeded by or waiting upon the performance of data traffic workflows. Moreover, a separate system for coordinating performance of the data traffic for a workflow can operate dynamically in order to provide performance that meets or satisfies performance requirements, such as a service level agreement (SLA) for the feature that triggers the data traffic workflow (e.g., replication that is completed within a specified time limit).

As data traffic workflows may be performed asynchronously, consideration of pending tasks for data traffic workflows may be made in order to determine performance adaptions for data traffic workflows, in various embodiments. Moreover, as workloads for data traffic workflows change over time, the history of pending tasks may provide insights into the management of resources to perform data workflow tasks. Dynamic performance configuration for data traffic workflows may, in various embodiments, evaluate the state information collected for pending tasks in order to account for the asynchronous nature of task performance as well as the change in workload over time. In this way, the performance data traffic workflow management may be improved as workflow specific adjustments made on system state and history can be determined and applied. For example, workflow specific adjustments can allow for the resources allocated to the workflow to be rightsized, preventing underutilization and overutilization of resources (which can be used to perform other work).

Figure 1:
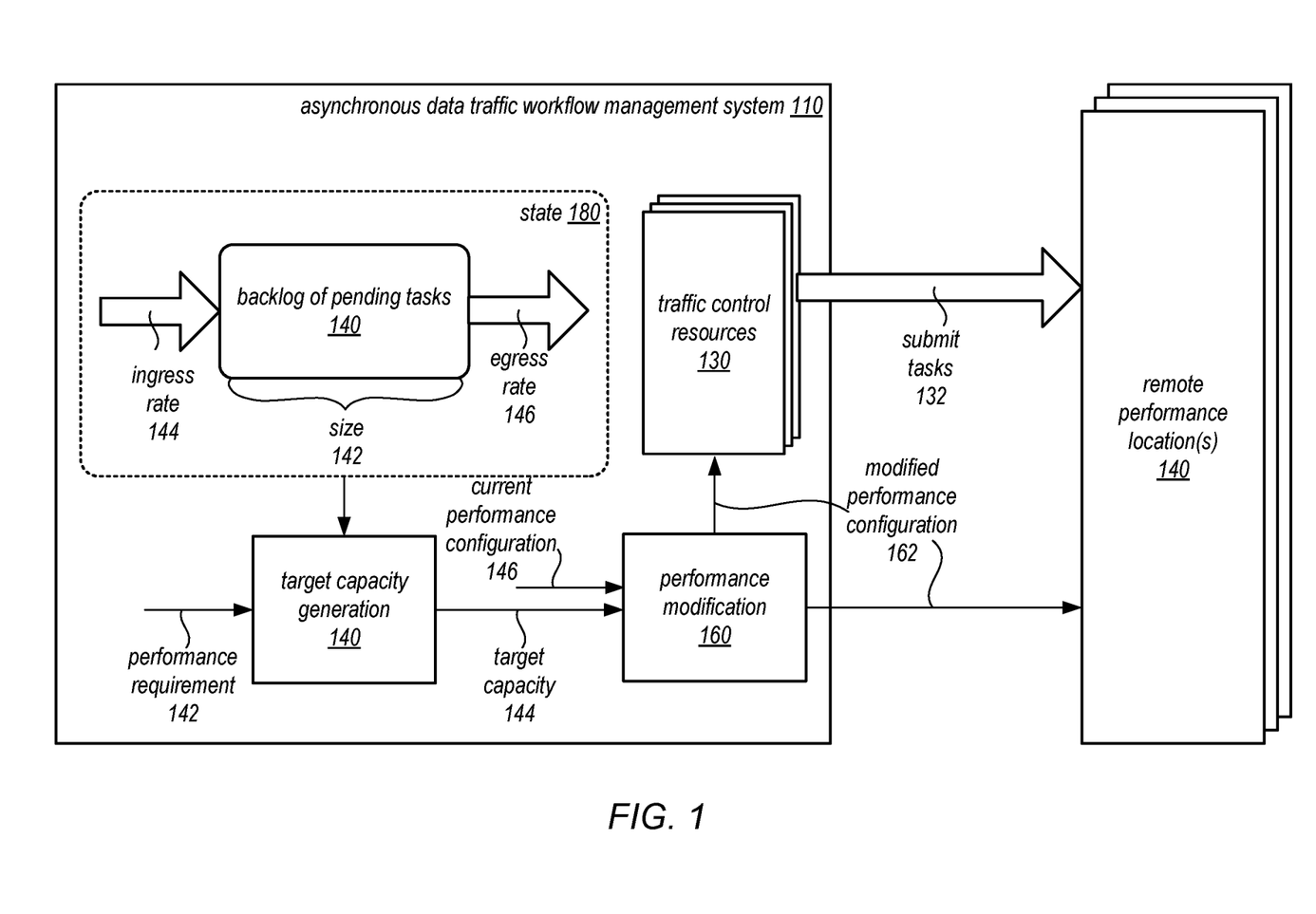
FIG. 1 illustrates a logical block diagram of dynamic performance configuration for data traffic workflows, according to some embodiments.

FIG. 1 illustrates a logical block diagram of dynamic performance configuration for data traffic workflows, according to some embodiments. Asynchronous data traffic workflow management system 110 may asynchronously and adaptively perform tasks for data traffic work workflows to remote performance location(s) 140. Asynchronous data traffic workflow management system 110 may coordinate external (to the asynchronous data traffic workflow management system) dependencies and balance the system inputs, outputs, which may provide performant handling of data traffic workflows in multiple contexts. Asynchronous data traffic workflow management system 110 may management the data traffic workflow and may not replicate the traffic itself, in some embodiments. To replicate the traffic, asynchronous data traffic workflow management system may utilize remote systems or services as remote performance location(s) 140, in some embodiments. Asynchronous data traffic workflow management system 110 may coordinate traffic flow in the data path through various internal and external dependencies (e.g., at remote performance locations 140).

As discussed in detail below with regard to FIGS. 2-7, in some embodiments asynchronous data traffic workflow management system 110 may implement performance modifications based on target capacities determined from pending tasks. For example, target capacity generation 140 may be implemented as part of asynchronous data traffic workflow management system 110, some embodiments. Target capacity generation 140 may determine the target capacities for performing tasks in a data traffic in order to satisfy a performance requirement, like performance requirement 142, for a data traffic workflow. For example, a time threshold may be a performance requirement applied for performing a task from the time an event that triggered task performance occurred. Other performance requirements, such as utilization limitations (e.g., network bandwidth, processor utilization, throughput utilization, such as Input/Output Operations Per Second (IOPS), and so on), may be applied for perform Target capacity generation 140 may also consider pending tasks represented in a state 180 of pending tasks in asynchronous data traffic workflow management system 110. For instance, backlog of pending tasks 140 may be the tasks pending in queues, such as various input and retry queues discussed with regard to FIG. 3, that are waiting to be performed. State 180 may describe backlog 140, including features such as ingress rate 144 (e.g., a rate of adding new tasks to the backlog 140), egress rate 146 (e.g., a rate of removing pending tasks that are completed—or not to be completed—from backlog 140), and/or size 142 (e.g., a number of tasks, size of data, etc.), in various embodiments.

Target capacity generation 140 may then provide a target capacity 144 (e.g., as indicated by a number of resources assigned for a data traffic workflow or the configuration of how those resources perform tasks) determined for meeting performance requirement 142 to performance modification 160 implemented as part of asynchronous data traffic workflow management system 110. Performance modification 160 may then compare target capacity 144 with current performance configuration 146 to determine modified performance configuration 162 (according to various techniques discussed below, such as those discussed below with regard to FIG. 7), which may be applied to traffic control resources 130 (e.g., as discussed below with regard to FIG. 4) that submit tasks 132 (e.g., from backlog 140) and/or remote performance location(s) 140 (e.g., as discussed below with regard to FIG. 5).

The previous description of asynchronous data traffic workflow management system 110 in FIG. 1 is a logical illustration and thus is not to be construed as limiting as to the architecture for implementing an asynchronous data traffic workflow management system 110. Various other arrangements of components to perform dynamic performance configuration data traffic workflows may be implemented in other embodiments.

This specification begins with a general description of a provider network that implements an asynchronous data traffic workflow management system to perform dynamic performance configuration for data traffic workflows as a service for different services across a provider network and/or provider network regions. Then various examples of the data traffic workflow management service including different components/modules, or arrangements of components/module that may be employed as part of implementing the data traffic workflow management service are discussed. A number of different methods and techniques to implement dynamic performance configuration for data traffic workflows are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
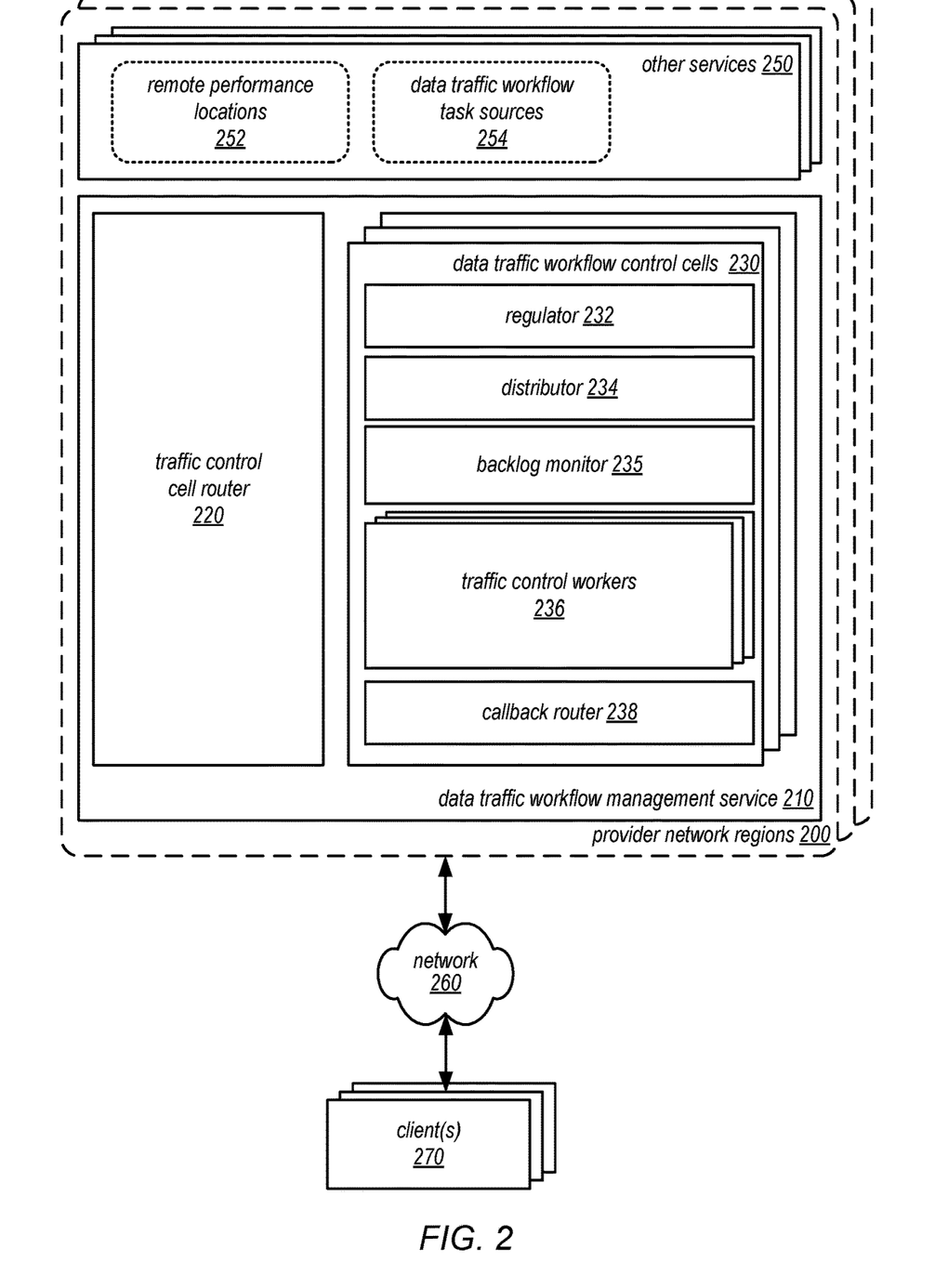
FIG. 2 is a logical block diagram illustrating a provider network implementing a data traffic workflow management service among other services, according to some embodiments.

FIG. 2 is a logical block diagram illustrating a provider network implementing a data traffic workflow management service among other services, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions 200, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network via a publicly accessible network (e.g., the Internet, a cellular communication network).

Regions 200 may be connected to a global network which includes private networking infrastructure (e.g., fiber connections controlled by the cloud provider) connecting each region to at least one other region, in some embodiments. The provider network may deliver content from points of presence outside of, but networked with, these regions 200 by way of edge locations and regional edge cache servers, in some embodiments. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as data traffic workflow management service 210 and other services 250, which may include a virtual compute service, data processing service(s) (e.g., map reduce, data flow, and/or other large scale data processing techniques), data storage services (e.g., object storage services, block-based storage services, various types of database services (e.g., SQL, NoSQL, document, graph, time series, and so on), blob storage, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 8 and described below. In various embodiments, the functionality of a given system or service component (e.g., a component of data traffic workflow management service 210 or other services 250) may be implemented by a particular node or may be distributed across several nodes. In some embodiments, a given node may implement the functionality of more than one service system component (e.g., more than one data store component).

Data traffic workflow management service 210 may implement techniques for dynamic performance configuration for data traffic workflows, as discussed above with regard to FIG. 1 and below with regard to FIGS. 3-7. Data traffic workflow management service 210 may implement traffic control cell router 220, in some embodiments. As discussed below with regard to FIG. 3, traffic control cell router 220 may be a front-end or other type of event dispatcher that accepts indications or other triggers of tasks for data traffic workflows for handling by data traffic workflow management service 210, in some embodiments. Traffic control cell router 220 may be implemented across one or multiple different nodes or groups/cells of nodes to handle high-throughput traffic from event trigger sources, data traffic workflow task sources 254, in some embodiments. In some embodiments, traffic control cell router 220 may filter or reject mal-formed, erroneous, or communications unrelated to data traffic workflow management. In some embodiments, traffic control cell router 220 may access metadata or other information to enhance or add to the information described in requests, which may be used to perform the data traffic workflows indicated by tasks. For example, traffic control cell router 220 may obtain access credentials, metadata descriptive of how operations are to be performed, or other data traffic workflow information, in some embodiments. Traffic control cell router 220 may route tasks to the appropriate data traffic workflow control cell 230 for a task according to various routing schemes, in some embodiments. For example, traffic control cell router 220 may utilize an identifier associated with a task (e.g., an account identifier) and/or a destination or location of remote performance locations 252 for the task, in some embodiments, (e.g., by applying a hash function to determine a cell).

In various embodiments, data traffic workflow management service 210 may implement data traffic workflow control cells 230. Data traffic workflow control cells 230 may be implemented to implement independent data traffic management resources which can dynamically manage the resources within the data traffic workflow control cells to meet performance requirements (e.g., Service Level Agreements (SLAs). For example, as discussed above, traffic control cell router 220 may choose (or send to) a data traffic workflow control cell 230 chosen according to various load-balancing schemes, allowing for work to be distributed a near balanced fashion.

Data traffic workflow control cells 230 may implement a regulator 232, in various embodiments. Regulator 232 may implement various management features for the data traffic workflow control cell (e.g., various control plane operations). In some embodiments, regulator 232 may handle the provisioning, creating, or otherwise configuring resources for performing data traffic workflows, in some embodiments (e.g., traffic control workers 236). Regulator 232 may communicate with traffic control workers 236 and other cell 230 components (or external components such as data stores utilized by a cell 230) using various protocols, such as heartbeat protocols to provide work partition assignments, like work partition assignments 237a, 237b, and 237c, detect, repair, and/or replace failed hosts for traffic control workers 236, among other communications. For example, in some embodiments, regulator 232 may release tasks worked on by a failed traffic control worker back to an input queue to be obtained and worked on by another traffic control worker 236 assigned to the work partition. In another example, regulator 232 may assign a transaction per second (TPS) value to a work partition for traffic control workers 236 to apply as a capacity limit for that work partition at the traffic control workers 236. As discussed below with regard to FIG. 4, regulator 232 may perform dynamic performance configuration updates.

Data traffic workflow control cells 230 may implement a distributor, like distributor 234, in various embodiments. Distributor 234 may serve as a front-end or other input control for cells 230, in some embodiments. For example, as discussed below with regard to FIG. 3, distributor 234 may read and/or pull from an input queue of tasks for cell 230, demultiplex the tasks to route them to the appropriate work partition (and, if necessary, obtain an assignment/creation of a new work partition). In some embodiments, distributor 234 may obtain work partition assignments 237 from regulator 232 for a data traffic workflow.

Data traffic workflow control cells 230 may implement a backlog monitor, like backlog monitor 235. Backlog monitor 235 may maintain durable view of the state of backlog for various data traffic workflows (e.g., for specific execution channels of a remote task execution service). In various embodiments, a backlog may include an input queue, which may store new tasks, and a retry queue, which may store tasks that failed and can be resubmitted. Backlog monitor 235 may maintain a history of the backlog over time and may provide an interface for obtaining state of the backlog, as discussed below with regard to FIG. 4.

Data traffic workflow control cells 230 may implement a group or fleet of traffic control workers, like traffic control workers 236, in order to provide a set of resources that can be dynamically assigned, repaired, and/or replaced to perform operations for a data traffic workflow assigned to a work partition. Traffic control workers 236 may receive one (or multiple) work partition assignments 237 from regulator 232, in some embodiments.

A work partition may be, in some embodiments, a unit of processing isolation assigned to particular sources, users, accounts, types of workflow or some other grouping by which one or multiple tasks for data traffic workflows may be assigned for performance as part of the unit of processing isolation. In some embodiments, a work partition may correspond to a single channel in a task execution service. A work partition may have data structures that can be read or updated by any assigned traffic control worker, such as a partition input queue and partition retry queue. These data structures may be stored separate from any individual traffic control worker (e.g., in a separate data store, such as a separate database table), in some embodiments. By assigning one (or more) traffic control workers 236 to a work partition, a work partition can be implemented to be elastic and are dynamically assigned sufficient resources (e.g., workers) to ingest from a backlog of data traffic workflows, prioritize operations between workflows and operations, batch operations, submit requests to perform tasks to remote operation execution resources at remote performance locations 252, adapt the workflow based on operation responses, collect statistics on operation performance for workflows, perform traffic shaping, redrive transient errors and ensure durability of workflow operations until completion of the workflow, in various embodiments.

In various embodiments, data traffic workflow control cells 230 may implement callback router 238. Callback router 238 may handle responses from requested operations at remote performance locations 252, in various embodiments. In this way, traffic control workers 236 can handle responses asynchronously to determine whether a data traffic workflow is complete, still pending, or needs to be retried, in some embodiments.

Data traffic workflow task sources 254 may be other services, systems, or components implemented as part of other services 250 (or external to provider network regions 200 (not illustrated) that cause or trigger data traffic workflow tasks, in some embodiments. For example, a data traffic workflow can be performed to replicate changes made to data in an identified storage location in a data storage service (e.g., one or more data objects stored in a container (e.g., directory, bucket, folder, lake, etc.) of an object-based store, such as various updates, additions, modifications, deletions, reformats, reassignments, and so on). In some embodiments, the task of a data traffic workflow may be communicated or sent to data traffic workflow management service via one or more intermediate communication systems or services.

Figure 4:
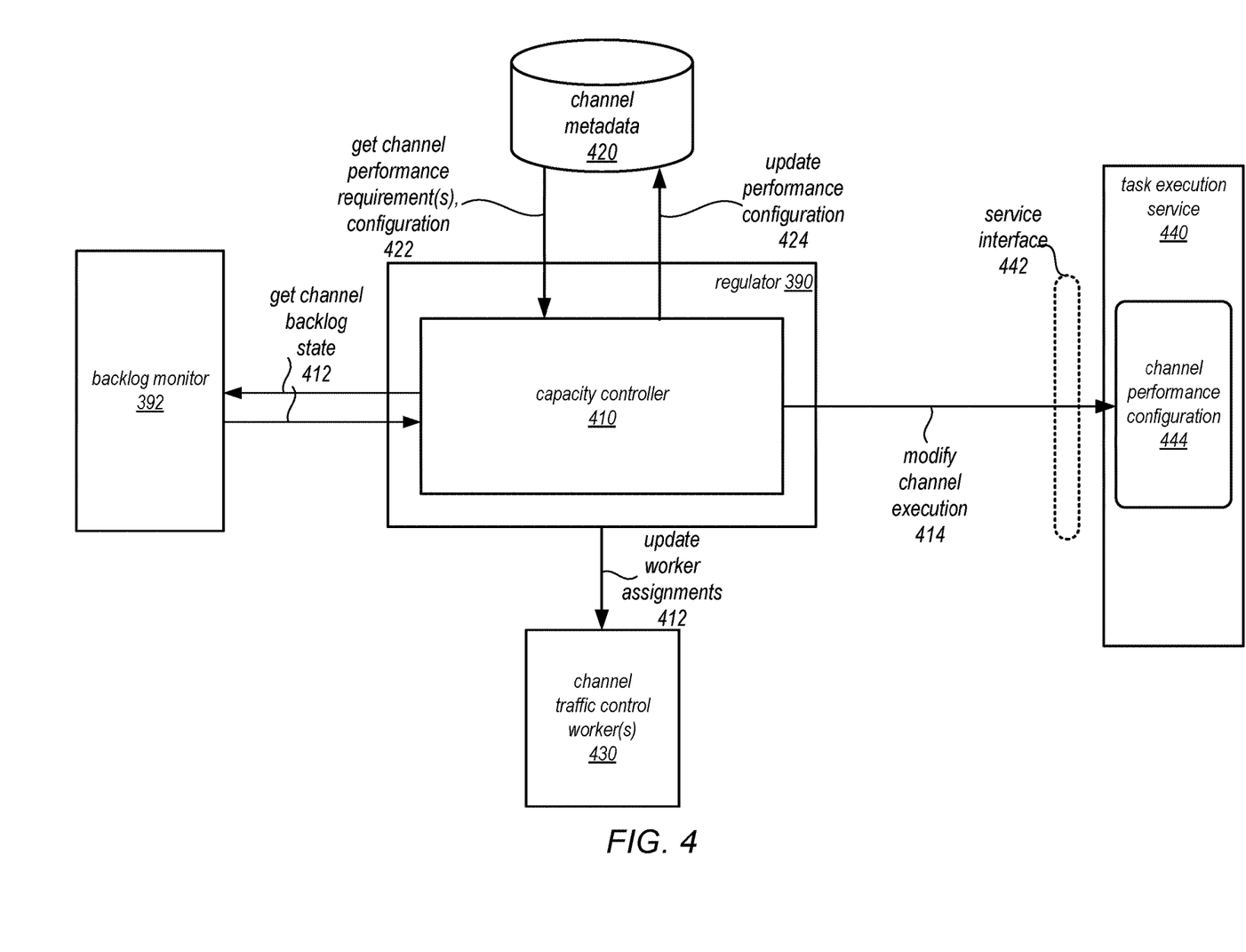
FIG. 4 is a logical block diagram of a capacity controller for a data traffic workflow management service, according to some embodiments.
Figure 5:
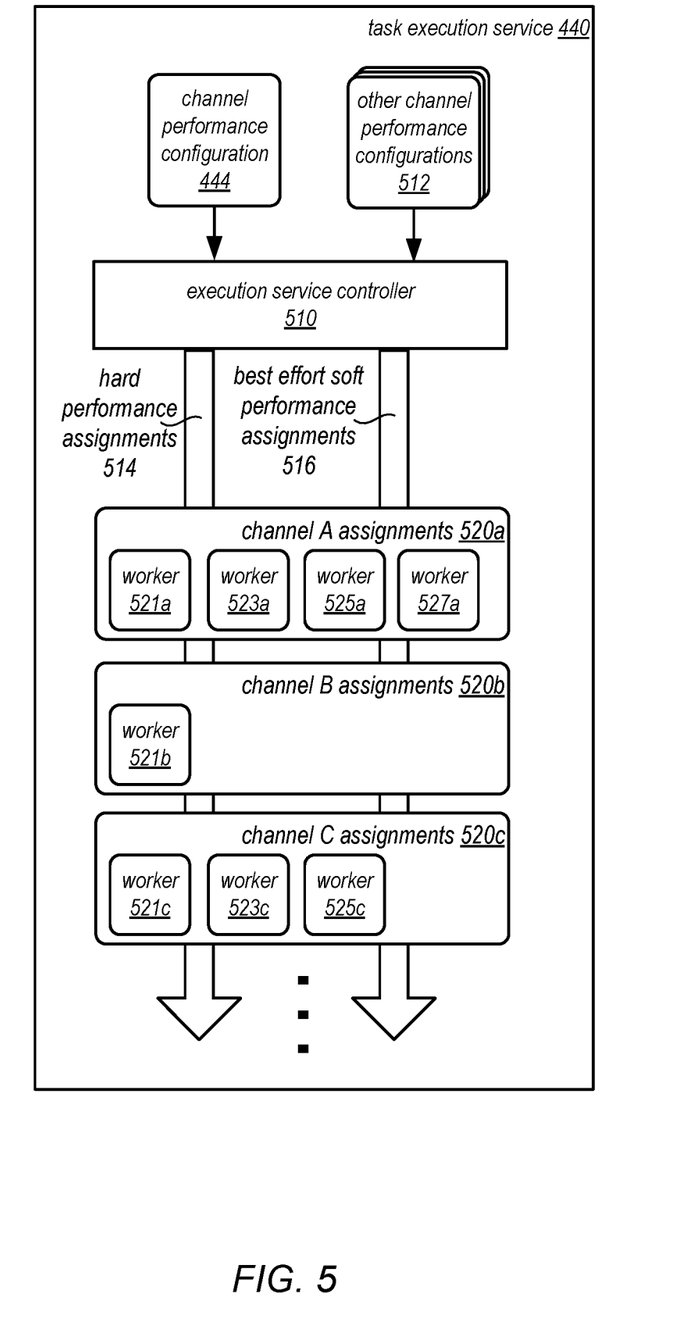
FIG. 5 is a logical block diagram of a task execution service that implements performance configuration changes for data traffic workflow tasks, according to some embodiments.

Remote performance locations 252 may be may be other services, systems, or components implemented as part of other services 250 (or external to provider network regions 200 (not illustrated) that perform the requested operations of a data traffic workflow remote from the source of the task and remote from data traffic workflow management service 210 (e.g., via remote procedure calls or other network requests), in some embodiments. Consider the example above of a data traffic workflow to replicate changes to a data object in a data storage service. The changes to the data storage service may be replicated to another type of storage service or to a different instantiation of the same data storage service in different region 200 than the region of the task (e.g., replicate an update to an object stored in region A to a copy of the object stored in region B). In such an example, remote performance locations 252 may include a data transfer or replication service that can, for example, perform the operations to replicate the changes to the different region (e.g., receive and perform the operation to update the copy of the object stored in region B in accordance with a request received from a traffic control worker 236 assigned to the work partition for that data traffic workflow). FIGS. 4 and 5 provide further examples of a remote performance location at a service that executes tasks.

Generally speaking, clients 270 may encompass any type of client configurable to submit network-based requests to provider network regions 200 via network 260, including requests for other services 250 (e.g., a request to create a database, start a computation job, setup a data stream, or other request that causes a data traffic workflow task to be triggered). For example, a given client 270 may include a suitable version of a web browser, or may include a plug-in module or other type of code module configured to access a management console to configure a replication task for a data object and specify performance requirements for the task (e.g., replication complete within a given time limit) that is managed as a task for a data traffic workflow by data traffic workflow management service 210. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document-based or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
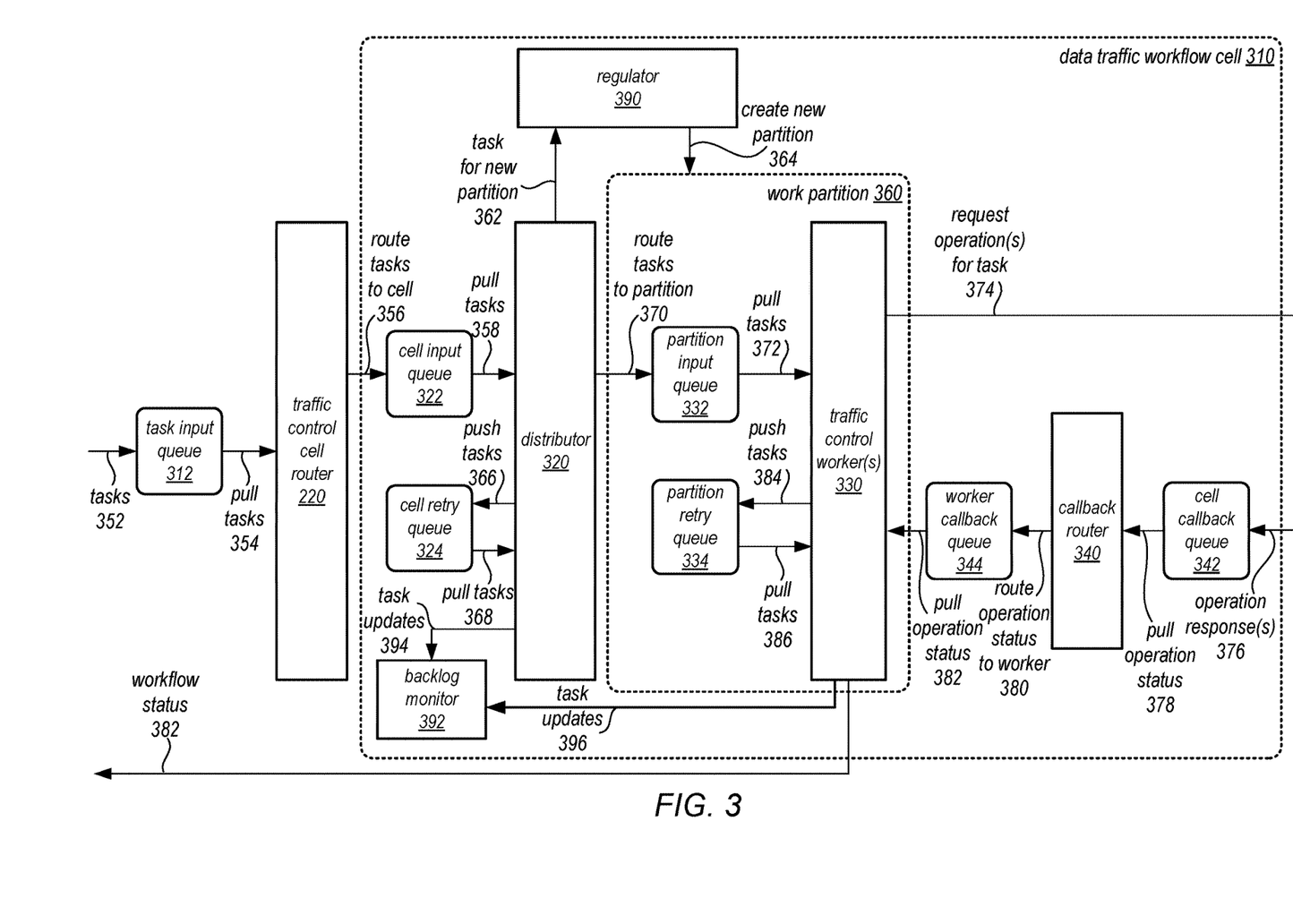
FIG. 3 is a logical block diagram of a data traffic workflow cell of a data traffic workflow management service among other services, according to some embodiments.

As discussed above, a data traffic workflow cell may provide a unit for handling some data traffic workflow tasks. FIG. 3 is a logical block diagram of a data traffic workflow cell of a data traffic workflow management service among other services, according to some embodiments. A task may be triggered that causes a data traffic workflow. These tasks may be received, as indicated 352, and stored in a task input queue 312 for data traffic workflow cell 310. For example, a data collection (e.g., bucket, container, blob, etc.) may have replication enabled, which triggers a replication data workflow when the data collection is changed (e.g., when an object is added to a source collection on a replication enabled collection). The storage service for the collection (or a monitoring or other service) may detect the change and provide (e.g., send, push, publish, etc.) information about the change to a traffic cell router (e.g., traffic control cell router 220), which may identify data traffic workflow cell 310 as the cell handling the replication workflow task.

In various embodiments, the traffic control router 220 may pull the task 354 from task input queue 312 and route 356 the task to cell 310 by placing the task into cell input queue 322. As distributor 320 can handle received tasks from cell input queue 322, such tasks can be handled in asynchronous fashion allowing, for instance traffic control cell router 220 to return to routing other tasks (e.g., to other cells). Distributor 320 can read and pull 358 tasks from cell input queue 322 when the cell can handle the traffic. Distributor 320 may dispatch the task to the assigned work partition, such as work partition 360, by routing the vent to partition input queue 332, as indicated at 370. For example, different data traffic workflow tasks for the same workflow, account, user, source object, and/or source destination may be assigned to the same work partition. Therefore, for some tasks, a work partition already exists. For tasks where a work partition does not exist (e.g., cannot be found in a partition mapping or other information provided by regulator 390), then distributor 320 may request a new partition for the task, as indicated at 362, from regulator 390. Regulator 390 may create the data structures, files, or objects for a new partition, such as partition input queue 332 partition retry queue 334, worker callback queue 344, make the assignment to traffic control worker(s) 330 (e.g., based on known loads on the traffic control workers 330 for other work partitions already assigned to those traffic control workers 330), and perform various other configuration operations (e.g., configuring or request the resources from a remote performance location) to create new partition 364. As indicated at 394, traffic distributor 320 may update the backlog of tasks at backlog monitor 392 for cell 310 (e.g., to indicate that tasks are added to/removed from a queue).

Traffic control worker(s) 330 assigned to partition 360 may pull tasks 372 from partition input queue 332. In some embodiments, a single worker may pull a single task to perform the operations of that workflow so that redundant worker is not performed by multiple traffic control workers 330. Traffic control worker 330 may prepare, prioritize, batch, and or otherwise send operation requests, as indicated 374 to a remote performance location. The system(s) or service(s) (e.g., remote performance locations 252 in other services 250 in FIG. 2) that handle the requests may perform (or fail to perform the requested operation(s), collect successes/errors and may, in some embodiments, return the success/errors in one or more responses 376 (which may be called a callback in some embodiments). In some embodiments, the response 376 may be a response for a batch of operations for a workflow.

Operations responses 376 may be stored in cell callback queue 342, in some embodiments. Callback router 340 may parse, demultiplex, or otherwise interpret responses pulled 378 from cell callback queue 342 and route the operation status 380 to the traffic control worker that requested the operations (e.g., as callback router 340 may route requests for multiple and/or all work partitions in data traffic workflow cell 310, in some embodiments). For example, routing an operation response to traffic control worker 330 may be writing it to worker callback queue 344 (which may be a host specific callback queue of the host that originated the operations being called back). Traffic control worker(s) 330 may then pull operation status 382 from worker callback queue 344. Workflow status 382 indications may be sent, stored, or otherwise communicated to provide completion, failure, or individual workflow portion updates to one or multiple systems (e.g., in a system that tracks workflow performance to prevent redoing work if a traffic control worker 330 fails but a portion of the workflow was completed successfully). For failed operations, traffic control worker(s) 330 may push tasks 384 to partition retry queue 334. Partition retry queue 334 may be read and pulled from 386 by traffic control worker(s) 330 (which may or may not be the same worker that first attempted the operation/task), in some embodiments. As indicated at 396, traffic control worker(s) 330 can provide task updates to backlog monitor 392 to update a backlog (e.g., indicate completed tasks (or tasks that cannot be completed) that are removed from a queue).

As discussed above, a regulator such as regulator 232 in FIGS. 2 and 390 in FIG. 3 may manage various aspects of data traffic workflow performance, which may include dynamic performance configuration using a capacity controller. FIG. 4 is a logical block diagram of a capacity controller for a data traffic workflow management service, according to some embodiments.

Capacity controller 410 may periodically perform adjustments to the performance data traffic workflows, in some embodiments, by modifying a performance configuration for the data traffic workflows. For example, capacity controller 410 may perform performance modification on a channel basis (e.g., where a channel may be a performance unit for a remote performance location like task execution service 440). In other embodiments, capacity controller 410 may perform performance modification upon a work partition basis.

Capacity controller 410 may get channel backlog state 412 from backlog monitor 392. For example, backlog monitor 392 may implement an API or other interface that aggregates state information for different respective backlogs for different respective channels that is updated and provided in response to requests (e.g., which may be aggregated from one (or more) corresponding work partitions for a channel). In some embodiments, backlog state may be a set of counters, where each counter is maintained as a series of instantaneous samples over small intervals of time (e.g., one minute). In some embodiments, backlog monitor may maintain the following counters for both the input and retry queues: N_tasks_t and N_bytes_t: the number of tasks/bytes added to the queue during the specified interval minus the number of such tasks/bytes that have completed; In_tasks_t and In_bytes_t: the queue's ingress rate of tasks/bytes over the specified interval; and Out_tasks_t and Out_bytes_t: the queue's egress rate of tasks/bytes over the specified interval.

When a given task t to replicate b bytes is added to a queue at time to, backlog monitor 392 may increment N_tasks_t0 and In_tasks_t0 by 1 and N_bytes _t0 and In_bytes_t0 may be incremented by b. When the task is removed from the queue at time t1, backlog monitor 392 may decrement N_tasks_t0 and N_bytes _t0 (corresponding to when the task was originally added to the queue) by 1 and b, respectively, while Out_tasks_t1 and Out_bytes_t1 (corresponding to the time the task completed) may be incremented by 1 and b, respectively.

Thus for any time t, the total number of tasks/bytes in a queue can be calculated by summing N_tasks_x and N_bytes _x for $\{x|0<=x<=t\}$. In some embodiments, the state maintained by backlog monitor 392 for a channel may be time limited $\{x|t-w<=x<=t\}$, where w is 24 hours (in other words, aggregate counters 'expire' after 24 hours). In this way, the risk of capacity leaks is mitigated, where, for example, workers fail to decrement counters when completing tasks. In this manner, even if all decrement operations fail, the modeled backlog size may eventually converge to zero when traffic subsides.

Capacity controller 410 may also obtain information about the channel from channel metadata 420 (e.g., in a service 210 data store or other data store). For example, capacity controller 410 may get channel performance requirements and performance configuration information 422, in some embodiments. Capacity controller 410 may then determine a target capacity for the channel. In some embodiments, different target capacities may be for different respective performance requirements (e.g., hard requirements, which may be a minimum necessary performance, and soft, which may be a preferred/expected performance). In some embodiments, target capacity may be calculated using an assumption of an idealized channel that processes its backlog in FIFO order and introduces no additional system overhead (e.g., no scheduling delay, failures/retries, etc.).

Target capacity may be determined, at least in part, on backlog size, in some embodiments. In some embodiments, backlog size may be the aggregate number of pending tasks. For example, consider a channel c with performance requirement r (e.g., a data replication requirement). Let Backlog(c, t) give the set of objects in c's backlog at time t, and let Size(o) and CreationTime(o) give the size and creation time of object o, respectively. The bandwidth needed to meet the r for single object o at time t is given by ObjectBandwidth(o, r, t)=Size(o)/(r−(t−CreationTime(o))). Note that if r−(t−CreationTime(o))<=0 or ObjectBandwidth(o, r, t)>MaxSingleObjectThroughput, object o will miss its performance requirement. The total bandwidth needed for channel c to burn down its backlog given an performance requirement r at time t is ChannelBandwidth(c, r, t)=sum(ObjectBandwidth(o, r, t) for o in Backlog(c, t)). A similar construction with Size(o)=1 for all o in Backlog(c, t) gives the total TPS needed for channel c at time t. BacklogCapacity(c, r, t) gives the capacity required to burn down the backlog for channel c at time t given the performance requirement r. It is calculated as ChannelBandwidth(c, r, t)/Utilization(c), where Utilization(c) gives the desired utilization for the channel. The utilization factor may provide a buffer for inefficiencies, response delays, etc., in some embodiments.

Target capacity may be determined, at least in part, on ingress rate, in some embodiments. In some embodiments, ingress rate may be the arrival rate of new tasks. IngressCapacity(c, t) may give the capacity needed to match the arrival rate of new tasks for a channel c at time t. Ingress capacity may be calculated by dividing the ingress traffic rate by Utilization(c), and it gives the capacity required to meet any performance requirement for a channel, assuming no backlog has accrued and no transient errors are encountered.

Target capacity may be determined, at least in part, on egress rate, in some embodiments. In some embodiments, egress rate may be the completion rate of existing tasks. EgressCapacity(c, t) may give the capacity needed to match the completion rate of existing tasks for a channel c at time t. Egress capacity may be useful when tasks cannot be completed at the rate predicted by the current channel capacity because they are delayed due to downstream dependencies (e.g., throttling from S3 at the destination). Egress capacity may be calculated by dividing the egress traffic rate by Utilization(c).

As noted above, in some embodiments, two target capacities may be determined for each channel, TargetCapacity(c, r_hard, t) and TargetCapacity(c, r_soft, t), giving the capacities required to meet the hard and soft performance requirement deadlines for channel c at time t. TargetCapacity(c, r, t) is given by InputCapacity(c, r, t)+RetryCapacity(c, t). InputCapacity(c, r, t) may give the capacity required by channel c at time t to service its input queue. InputCapacity (c, r, t) may be max(BacklogCapacity(c, r, t), IngressCapacity(c, t)), in some embodiments. RetryCapacity(c, t) may give the capacity needed to retry failed tasks. Retry capacity may be given by EgressCapacity(c, t−1)*RetryScaleFactor (c), where RetryScaleFactor(c) determines how aggressively to attempt to retry delayed traffic. RetryScaleFactor(c) value can be larger than one, in some embodiments, allowing opportunistically scaling up if downstream services cease to be a bottleneck while preventing us from overwhelming dependencies.

Once target capacities are determined, a comparison with the obtained performance configuration can be made by capacity controller 410. For example, the techniques discussed with regard to FIG. 7 below may be implemented where adjustments to capacities are made after target capacities are different from configured capacities by some amount for some period of time. Changes to performance configuration may be recorded, as indicated at 424 in channel metadata 420. Requests to modify channel execution 414 may be made via service interface 442 of task execution service 440 to modify channel performance configuration 444 (which may invoke operations to make the requested configuration changes). Similarly, worker assignments or instructions (e.g., fetch rates from queues) may be updated, as indicated at 412 to channel traffic control worker(s) 430, in some embodiments.

Different types of remote performance locations may offer different performance capabilities which can be configured as part of performance configuration modification for a data traffic workflow. FIG. 5 is a logical block diagram of a task execution service that implements performance configuration changes for data traffic workflow tasks, according to some embodiments. Task execution service 440 may implement various task workers (e.g., which may be similar to workers for traffic resources in FIGS. 2 and 3) to handle performance of tasks in a channel. Task execution service 440 may implement execution service controller 510, which may evaluate channel performance configurations, such as the modified channel performance configuration 444 and other channel performance in order to make assignments, such as assignments 520*a*, 520*b*, and 520*c* of workers, such as workers 521*a*, 523*a*, 525*a*, 527*a*, 521*b*, 521*c*, 523*c*, and 525*c*.

In some embodiments, task execution service 440 may support both hard and soft performance requirements, as noted above. Hard performance assignments 514 may be made first to ensure that they are met. A best effort assignment for soft performance requirements, as indicated at 516 may be made after hard performance assignment 514. For example, resource allocation can be viewed as a constrained optimization problem: given a set of channels C={c_0, c_1, . . . , c_n}, each with targets TargetCapacity(c_i, r_hard, t) and TargetCapacity(c_i, r_soft, t), a set of workers W={w_0, w_1, . . . , w_m}, each contributing WorkerCapacity(w_i), and a set of assignments A={a_0, a_1, . . . , a_n} giving capacity assignments from workers to channels, find a set of assignments A' such that: (1) sum(WorkerCapacity (w) for w in W)>=sum(TargetCapacity(c, r_hard, t) for c in C)→Capacity(c)>=TargetCapacity(c, r_hard, t) for all c in C; (2) sum(WorkerCapacity(w) for w in W)>=sum(TargetCapacity(c, r_soft, t) for c in C)→Capacity(c)=TargetCapacity(c, r_soft, t) for all c in C; (3) Capacity(c)>=TargetCapacity(c, r_hard, t)→Capacity(c_i)>=TargetCapacity(c_i, r_hard, t) for all c_i in C such that Priority(c_i)>Priority(c); and (4) the difference between A and A' is minimized. Constraints (1) and (2) state that the soft and hard capacity requirements are met for every channel, if possible; constraint (3) states that higher-priority channels get preferential treatment if capacity is constrained; and constraint (4) states that assignment churn should be minimized as much as possible.

Although FIGS. 2-5 have been described and illustrated in the context of a data traffic workflow management service, the various techniques and components illustrated and described in FIGS. 2-5 may be easily applied to other data traffic workflow management systems in different embodiments for one or multiple different systems or services, which may be public or private. As such, FIGS. 2-5 are not intended to be limiting as to other embodiments of a system that may implement dynamically managed data traffic workflows.

Various different systems and devices may implement the various methods and techniques described below, either singly or working together. For example, data traffic workflow management service such as described above with regard to FIGS. 2-5 may be configured to implement the various methods. Therefore, the above examples and or any other systems or devices referenced as performing the illustrated method, are not intended to be limiting as to other different components, modules, systems, or configurations of systems and devices.

Figure 6:
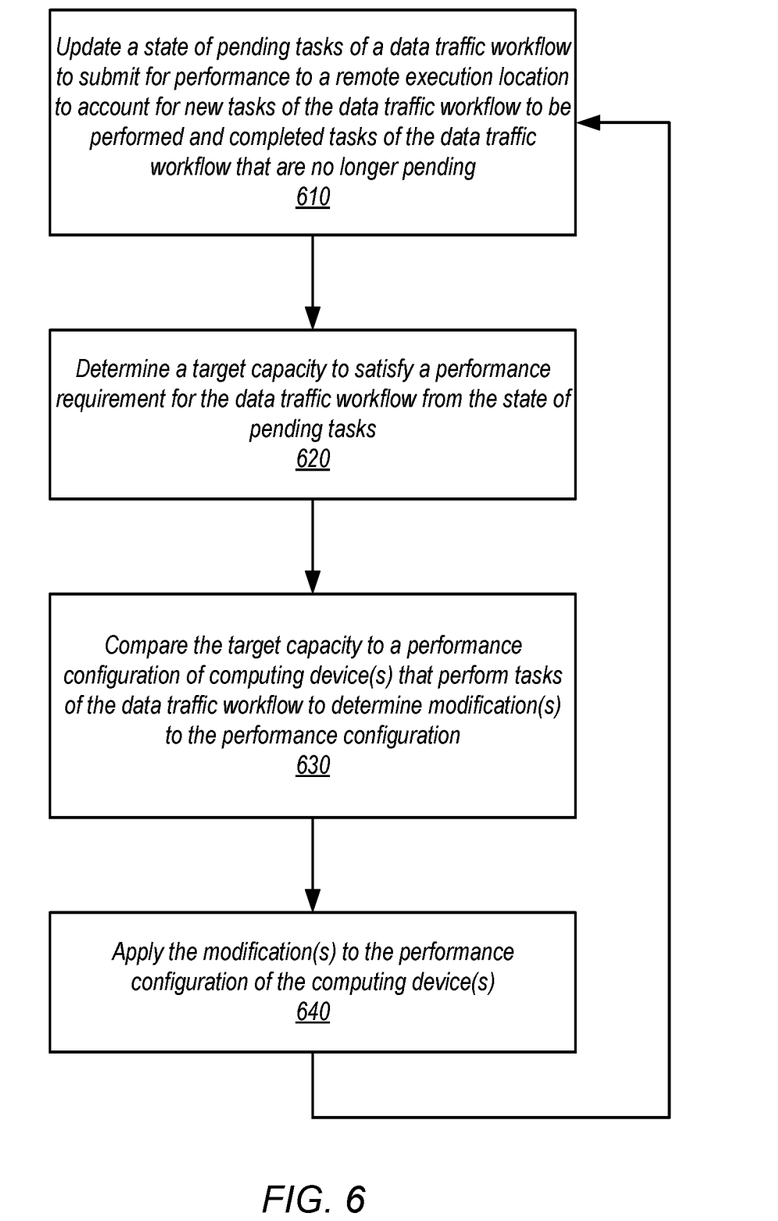
FIG. 6 is a high-level flowchart illustrating various methods and techniques to implement dynamic performance configuration for data traffic workflows, according to some embodiments.

FIG. 6 is a high-level flowchart illustrating various methods and techniques to implement dynamic performance configuration for data traffic workflows, according to some embodiments. As indicated at 610, a state of pending tasks of a data traffic workflow to submit for performance to a remote execution location to account for new tasks of the data traffic workflow to be performed and completed tasks for the data traffic workflow that are no longer pending, in some embodiments. For example, backlog state or other information indicative of tasks in an input queue and completed tasks as indicated in a callback queue may be updated by resources performing the different tasks (e.g., distributed 320 and traffic control worker(s) 330 in FIG. 3). In some embodiments, the state of pending tasks may be implemented in centralized fashion (e.g., at a backlog monitor). In some embodiments, the state of pending tasks may be collected from resources (e.g., various nodes, systems, or devices performing tasks) at different times in order to analyze whether modifications to the performance configuration may need to be performed.

As indicated at 620, a target capacity may be determined to satisfy a performance requirement for the data traffic workflow from the state of pending tasks, in some embodiments. For example, different types of performance requirements (e.g., hard or soft as discussed above) may be considered to determine the target capacity. As discussed above with regard to FIG. 4, ingress rate, egress rate, and/or other factors may be considered, such as the capacity for retrying failed tasks.

As indicated at 630, the target capacity may be compared to a performance configuration of computing device(s) that perform tasks of the data traffic workflow to determine modification(s) to the performance configuration, in some embodiments. For example, as discussed below with regard to FIG. 7, if a current configuration has a capacity value (e.g., a rate for pulling items from a input queue) less than a target capacity, modifications to change the configuration to increase the capacity value to meet the target capacity may be made (e.g., increase the rate for pulling items). Similar, modifications to decrease currently configured capacity that exceed a target capacity can also be determined.

As indicated at 640, the modifications may be applied to the performance configuration of the computing device(s) (e.g., remote performance locations, such as task execution service 440 in FIG. 4 and/or traffic control worker(s) 236 and 330 in FIGS. 2 and 3, in some embodiments. For example, requests can be submitted to computing device(s) implementing remote performance locations to change the number of resources, speed/throughput, or other performance aspect of tasks in order to make the modifications, as discussed above with regard to FIG. 5. In another example, requests can be submitted to computing devices that are submitting tasks and handling responses from remote performance locations to change the rate at which tasks are submitted (e.g., as discussed above with regard to FIG. 4).

Figure 7:
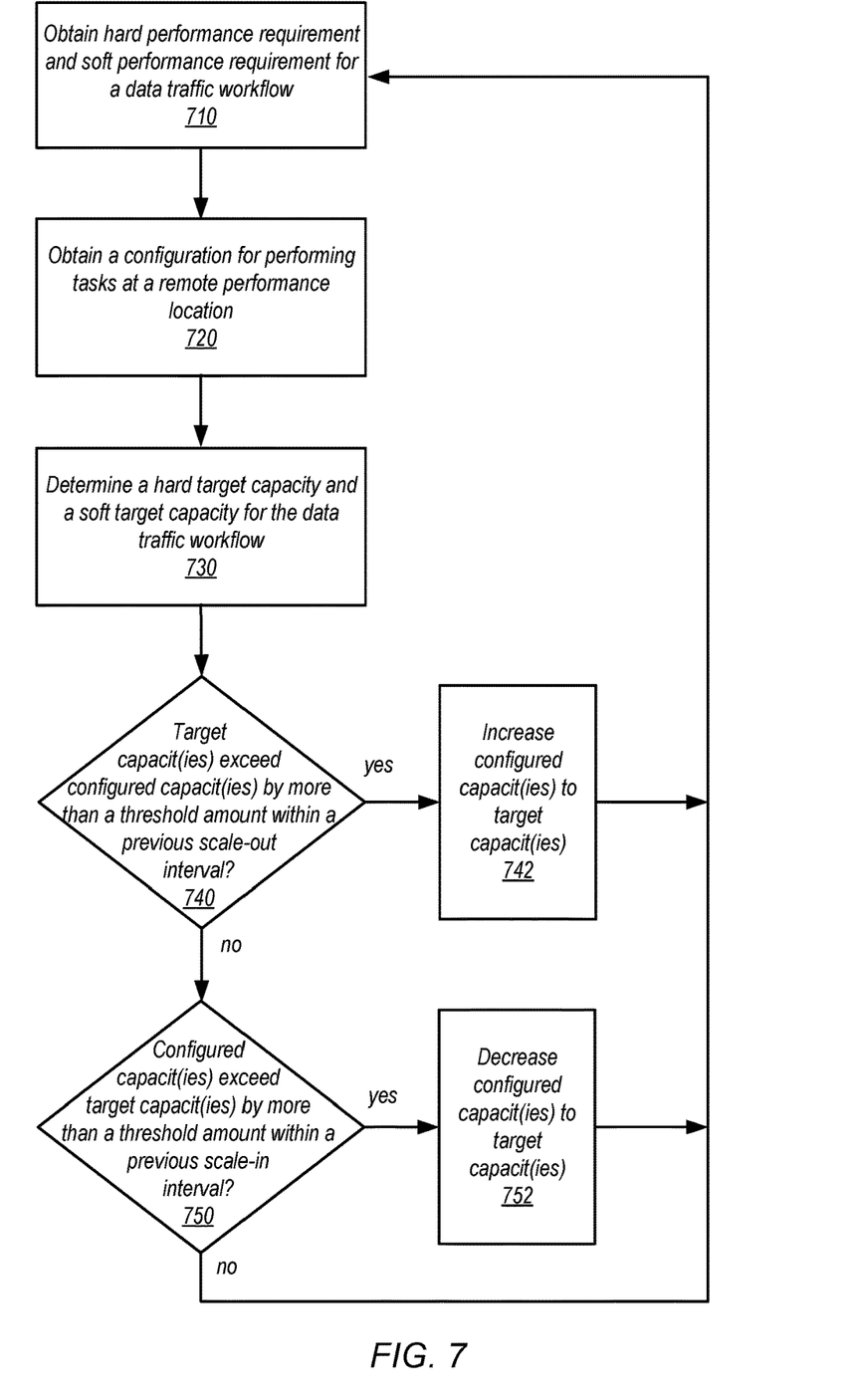
FIG. 7 is a high-level flowchart illustrating various methods and techniques to implement determining modifications to performance configurations for a data traffic workflow, according to some embodiments.

Different types of performance configuration modifications may be applied. Some performance configuration modifications may be made to worker assignments that submit requests to the remote performance location. Some configuration modifications may be submitted to the remote performance location for application. FIG. 7 is a high-level flowchart illustrating various methods and techniques to implement determining modifications to performance configurations for a data traffic workflow, according to some embodiments.

As indicated at 710, a hard performance requirement and a soft performance requirement may be obtained for a data traffic workflow, in some embodiments (e.g., as may be specified for a data traffic workflow via configuration file or other metadata describing the data traffic workflow). As indicated at 720, a configuration for performing tasks at a remote performance location 720 may be obtained, in some embodiments. For example the configuration of devices submitting tasks for performance to remote execution resources, as well as the configuration of the remote resources, may be obtained as the configuration for performing tasks at the remote performance location. As indicated at 730, a hard target capacity and a soft target capacity may be determined for the data traffic workflow. For example, the techniques discussed above with regard to FIG. 4 may be applied to determine hard and soft target capacities.

Different types of strategies for when to apply performance modifications may be implemented. For example, performance modifications may be made when actual performance diverges from target performance for a period of time, such as the scale-out and scale-in time thresholds discussed below. As indicated at 740, if target capacit(ies) (of either or both hard/soft target capacities) exceed configured capacities by more than a threshold amount (e.g., 20%) within a previous scale-out interval (e.g., 1 hour), then as indicated at 742, a configured capacit(ies) may be increased to target capacit(ies), in some embodiments. Similarly, as indicated at 750 if configured capacit(ies) (of either or both hard/soft configured capacities) exceed target capacities by more than a threshold amount (e.g., 20%) within a previous scale-in interval (e.g., 1 hour), then as indicated at 752, a configured capcit(ies) may be decreased to target capacit (ies), in some embodiments. Such techniques may be iteratively performed, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
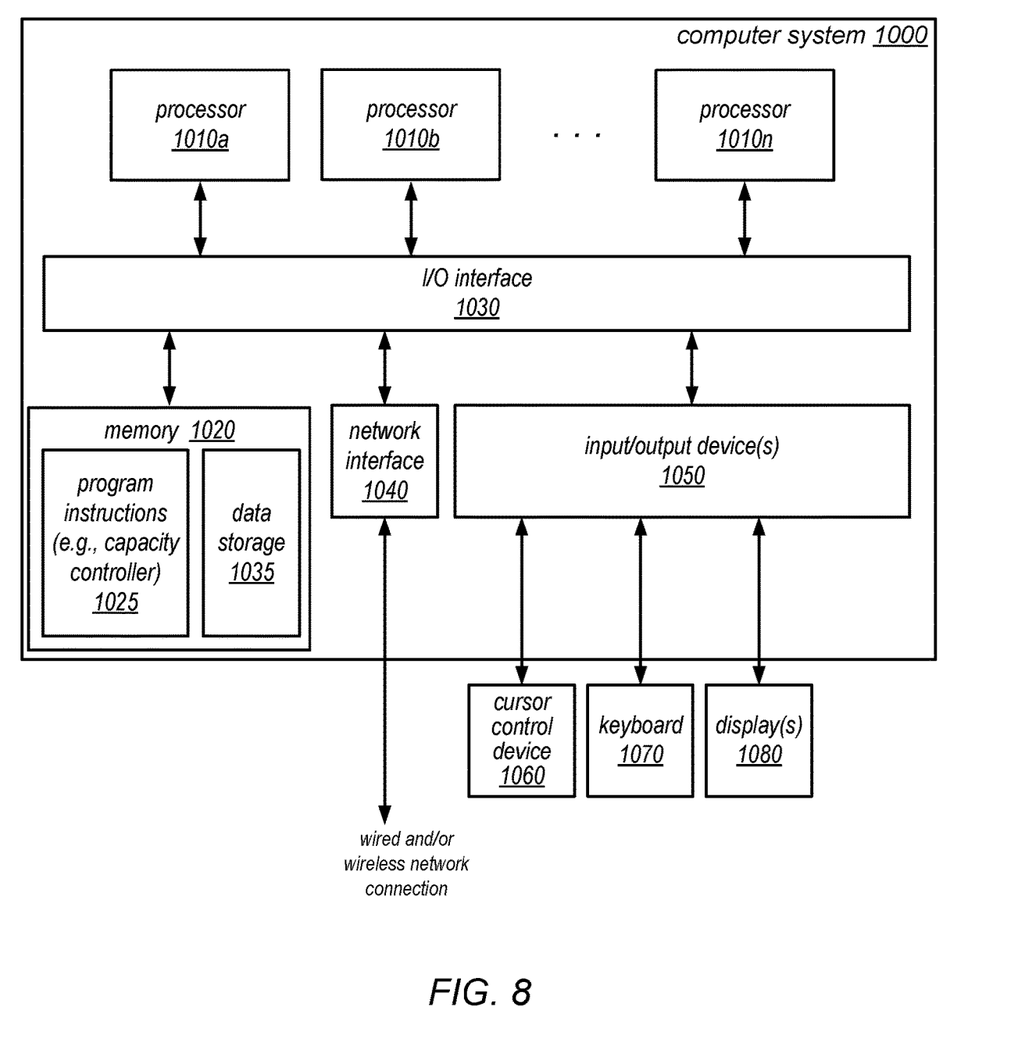
FIG. 8 illustrates an example system configured to implement the various methods, techniques, and systems described herein, according to some embodiments.

Embodiments of dynamic performance configuration for data traffic workflows as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-performance requirements or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corp, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., capacity controllers, backlog monitors, task managers or other features of dynamic performance configuration for data traffic workflows) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for performance requirements of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a data traffic workflow management system, configured to:
      update a state of a backlog of pending tasks of a data traffic workflow to submit for performance to a remote execution location that describes an ingress rate for new tasks of the data traffic workflow to be performed in the backlog, an egress rate of tasks of the data traffic workflow that are no longer pending in the backlog, and a size of the backlog;
      calculate a target capacity to satisfy a performance requirement for the data traffic workflow from the state of the backlog;
      compare the target capacity to a performance configuration instructed by the data traffic workflow management system that perform tasks of the data traffic workflow to determine one or more modifications to the performance configuration; and
      instruct the one or more modifications to the performance configuration.

2. The system of claim 1, wherein to instruct the one or more modifications to the performance configuration, the data traffic workflow management system is configured to send a request to a task execution service implementing the remote performance location to modify a capacity at the task execution service for performing the data traffic workflow.

3. The system of claim 1, wherein the one or more modifications includes a change in an assignment of traffic control workers to the data traffic workflow.

4. The system of claim 1, wherein the data traffic workflow is implemented to replicate changes to objects stored in storage service of a provider network.

5. A method, comprising:
   updating a state of pending tasks of a data traffic workflow to submit for performance to a remote execution location to account for new tasks of the data traffic workflow to be performed and completed tasks of the data traffic workflow that are no longer pending;
   determining a target capacity to satisfy a performance requirement for the data traffic workflow from the state of pending tasks;
   comparing the target capacity to a performance configuration of one or more computing devices that perform tasks of the data traffic workflow to determine one or more modifications to the performance configuration; and
   applying the one or more modifications to the performance configuration of the one or more computing devices.

6. The method of claim 5, wherein applying the one or more modifications to the performance configuration of the one or more computing devices comprises sending a request to a task execution service implementing the remote performance location to modify a capacity at the task execution service for performing the data traffic workflow.

7. The method of claim 5, wherein the modification to the capacity at the task execution service is a requested increase in capacity.

8. The method of claim 5,
   wherein the performance requirement is a soft performance requirement and wherein the target capacity is a soft target capacity;
   wherein the method further comprises determining a hard target capacity to satisfy a hard performance requirement for the data traffic workflow from the state of pending tasks; and
   wherein the one or more modifications are determined based on both the hard target capacity and the soft target capacity.

9. The method of claim 5, wherein comparing the target capacity to the performance configuration of the one or more computing devices that perform tasks of the data traffic workflow to determine the one or more modifications to the performance configuration comprises determining that a difference between a configured capacity and the target capacity exceeds a threshold.

10. The method of claim 9, wherein comparing the target capacity to the performance configuration of the one or more computing devices that perform tasks of the data traffic workflow to determine the one or more modifications to the performance configuration further comprises determining that the difference between the configured capacity and the target capacity exceeded the threshold for a time interval.

11. The method of claim 5, wherein the target capacity is determined based on an input target capacity and a retry target capacity.

12. The method of claim 5, wherein the updating, the determining, the comparing, and the applying are performed to determine and to apply one or more different modifications to the performance configuration of the one or more computing devices.

13. The method of claim 5, wherein applying the one or more modifications to the performance configuration of the one or more computing devices comprises changing an assignment of computing devices to the data traffic workflow.

14. One or more non-transitory, computer-readable storage media, storing program instructions that when executed on or across one or more computing devices cause the one or more computing devices to implement:
   accessing a state of pending tasks of a data traffic workflow to submit for performance to a remote execution location updated to account for new tasks of the data traffic workflow to be performed and completed tasks of the data traffic workflow that are no longer pending;
   determining a target capacity to satisfy a performance requirement for the data traffic workflow from the state of pending tasks;
   comparing the target capacity to a performance configuration of one or more computing devices that perform tasks of the data traffic workflow to determine one or more modifications to the performance configuration; and
   instructing the one or more modifications to the performance configuration of the one or more computing devices.

15. The one or more non-transitory, computer-readable storage media of claim 14, wherein, in instructing the one or more modifications to the performance configuration of the one or more computing devices, the program instructions when executed on or across the one or more computing devices cause the one or more computing devices to implement sending a request to a task execution service implementing the remote performance location to modify a capacity at the task execution service for performing the data traffic workflow.

16. The one or more non-transitory, computer-readable storage media of claim 15, wherein the modification to the capacity at the task execution service is a requested decrease in capacity.

17. The one or more non-transitory, computer-readable storage media of claim 14, wherein, in comparing the target capacity to the performance configuration of the one or more computing devices that perform tasks of the data traffic workflow to determine the one or more modifications to the performance configuration, the program instructions when executed on or across the one or more computing devices cause the one or more computing devices to implement determining that a difference between a configured capacity and the target capacity exceeds a threshold.

18. The one or more non-transitory, computer-readable storage media of claim 14, wherein, in comparing the target capacity to the performance configuration of the one or more computing devices that perform tasks of the data traffic workflow to determine the one or more modifications to the performance configuration, the program instructions when executed on or across the one or more computing devices cause the one or more computing devices to further implement determining that the difference between the configured capacity and the target capacity exceeded the threshold for a time interval.

19. The one or more non-transitory, computer-readable storage media of claim 14, wherein the one or more modifications includes a change in an assignment of traffic control workers to the data traffic workflow.

20. The one or more non-transitory, computer-readable storage media of claim 14, wherein the data traffic workflow is implemented to perform the pending tasks for a provider network service, wherein a source that triggered performance of the pending tasks is in a first region of the provider network, and wherein the remote performance location is in a second region of the provider network.

* * * * *